United States Patent [19]

Freitag et al.

[11] 4,405,554

[45] Sep. 20, 1983

[54] USE OF HYDROGENATED POLYBENZYLS AS A MOULD-RELEASE AGENT FOR AROMATIC POLYESTERS

[75] Inventors: Dieter Freitag, Krefeld; Klaus Reinking, Wermelskirchen; Peter Tacke, Krefeld, all of Fed. Rep. of Germany

[73] Assignee: Bayer Aktiengesellschaft, Leverkusen, Fed. Rep. of Germany

[21] Appl. No.: 302,057

[22] Filed: Sep. 14, 1981

[30] Foreign Application Priority Data

Sep. 18, 1980 [DE] Fed. Rep. of Germany ...... 3035147

[51] Int. Cl.³ ............................................. B29B 5/04
[52] U.S. Cl. .................................. 264/300; 264/210.6; 264/211; 264/213; 264/328.17; 264/331.12; 264/338; 525/437

[58] Field of Search .................... 264/130, 210.6, 211, 264/213, 328.17, 331.12, 331.21, 338; 427/222; 524/474, 487; 525/437

[56] References Cited

U.S. PATENT DOCUMENTS 4,131,662 12/1978 Cekoric et al. ..................... 264/338

*Primary Examiner*—J. Ziegler
*Attorney, Agent, or Firm*—Connolly and Hutz

[57] ABSTRACT

Small quantities of hydrogenated polybenzyls act as a perfect mould release agent for aromatic polyesters based on diphenols and iso- and/or terephthalic acids and do not appreciably impair the elastic strength characteristics, the dimensional stability under heat and the transparency.

10 Claims, No Drawings

USE OF HYDROGENATED POLYBENZYLS AS A MOULD-RELEASE AGENT FOR AROMATIC POLYESTERS

This invention relates to the use of partly or completely hydrogenated polybenzyls as a mould-release agent for thermoplastic aromatic polyesters based on diphenols and iso- and/or terephthalic acids.

Aromatic polyesters are known (W. M. Eareckson, J. Polym. Sci. XL, 399–406 (1959); André Conix, "Thermoplastic Polyesters from Bisphenols", Ind. Eng. Chem., Vol. 51, No. 2. 147–150, Feb. 1959; French Pat. No. 1,177,517, U.S. Pat. No. 3,351,624 and German Auslegeschrift No. 1,445,384). Due to their outstanding characteristics, they are widely used where a high dimensional stability under heat and a good impact or notched impact strength are required.

Although the thermoplastic aromatic polyesters which have been known hitherto meet many requirements, experts are interested in further improving the characteristics of these polycondensates.

In injection moulding processes, short cycle times are required for economic reasons. A prerequisite for this is that the mouldings should be readily removable from the moulds, a characteristic which is important in particular for complicated mouldings and which predominantly depends on the type of injection moulding composition.

Esters of multifunctional alcohols and aliphatic carboxylic acids as well as bis-fatty acid amides, ester waxes and metal soaps (Japanese Published applications Nos. 74/129,747 and 75/51,152) have already been suggested as mould-release agents for thermoplastic aromatic polyesters.

Our experiments have shown that these prior art mould-release agents have to be used in relatively large quantities with the result that the elastic strength characteristics, the dimensional stability under heat and the transparency of the aromatic polyesters are undesirably impaired, and very considerably impaired upon repeated thermoplastic processing.

Surprisingly, it has now been found that just small quantities of hydrogenated polybenzyls ensure a perfect release from the mould and do not appreciably impair the elastic strength characteristics, the dimensional stability under heat and the transparency of the aromatic polyesters.

Thus, the present invention provides the use of hydrogenated polybenzyls as a mould-release agent for aromatic polyesters.

The hydrogenated polybenzyls to be used according to the invention preferably contain recurring units of the following formula:

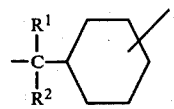

(I)

wherein
R¹ and R² each individually represent a hydrogen atom or an alkyl radical having from 1 to 5 carbon atoms.

The hydrogenated polybenzyls to be used according to the invention generally contain an average of from 3 to 300 such recurring units per molecule, preferably from 10 to 150 units, and therefore they have molecular weights $\overline{M}_n$ determined as a number average of from 300 to 300,000, preferably from 1,000 to 10,000 (determined by vapour pressure osmosis up to values of 7,000 and above this by membrane osmosis in dichloromethane).

Polybenzyls and the production thereof are known: see for example "Methoden der Organischen Chemie" (Houben-Weyl), Vol. 14/2, 607 Georg Thieme Verlag, Stuttgart 1963. Hydrogenation may be carried out by known methods; see Ullmann's Encyclopädie der technischen Chemie, Vol. 13, 4th edition, 135–147, Verlag Chemie, Weinheim 1977.

V. V. Korshak et al. report on the hydrogenation of polybenzyls in Izvest. Akad. Nauk S.S.S.R. Otdel. Khim. Nauk 1955, P. 1090–4.

Polybenzyls are usually produced by Friedel-Crafts auto-alkylation of benzyl halides of the following formula:

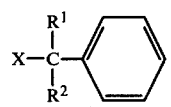

(II)

wherein
X represents an iodine or preferably a chlorine or a bromine atom, and
R¹ and R² are as defined above.

Alkylation takes place in the present case, as is known, in the o- and/or p-position, whereby branchings may naturally also be produced due to multiple alkylation.

Phenyl, tolyl and halogen methyl phenyl groups are included in particular as terminal groups.

The hydrogenated polybenzyls to be used according to the invention are even still effective when they contain up to 30 mol %, based on the number of carbocyclic radicals, of aromatic rings (which are still obtained as such, for example, owing to incomplete hydrogenation).

The hydrogenated polybenzyls to be used according to the invention correspond in an ideal case to the following formula:

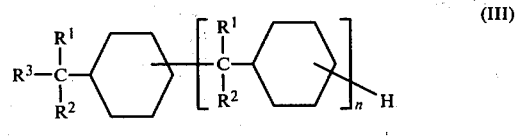

(III)

wherein
R¹ and R² are as defined above,
R³ represents X or a hydrogen atom, and
n represents a number from 3 to 300.

Possible branching positions are not illustrated in formula (III).

The mould-release agents to be used according to the invention are generally used in quantities of from 0.01 to 3, preferably from 0.05 to 1% by weight, based on the aromatic polyester.

Within the context of the invention, aromatic polyesters are thermoplastic polyesters obtained from aromatic dihydroxy compounds and iso- and/or terephthalic acids, chain terminators and optionally branching agents, wherein as much as 50 mol % of the ester groups may be replaced by carbonate groups.

The aromatic polyesters generally have relative solution viscosities of from 1.18 to 2.0, preferably from 1.2 to 1.5 (measured with a solution of 0.5 g of substance in 100 ml of CH$_2$Cl$_2$-solution at 25° C.).

Diphenols which are preferred for the production of the aromatic polyesters are compounds of the following formula:

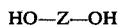
$$\text{HO—Z—OH} \qquad \text{(IV)}$$

wherein Z represents a divalent, mono- or polynuclear aromatic radical having from 6 to 30 carbon atoms, Z being constructed such that both OH groups are each directly linked to a carbon atom of an aromatic system.

Diphenols which are particularly preferred are compounds of the following formula:

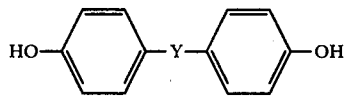

wherein Y represents a single bond, an alkylene or alkylidene radical having from 1 to 7 carbon atoms, a cycloalkylene or cycloalkylidene radical having from 5 to 12 carbon atoms, —O—, —S—,

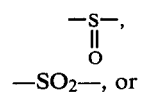

—SO$_2$—, or

and the nuclear-alkylated and nuclear-halogenated derivatives thereof, e.g.:
 hydroquinone,
 resorcinol,
 dihydroxydiphenyls,
 bis-(hydroxyphenyl)-alkanes,
 bis-(hydroxyphenyl)-cycloalkanes,
 bis-(hydroxyphenyl)-sulphides,
 bis-(hydroxyphenyl)-ethers,
 bis-(hydroxyphenyl)-ketones,
 bis-(hydroxyphenyl)-sulphoxides,
 bis-(hydroxyphenyl)-sulphones and
 α,α'-bis-(hydroxyphenyl)-diisopropylbenzenes
and the nuclear-alkylated and nuclear-halogenated compounds thereof, in particular, e.g.: bisphenol A=2,2-bis-(4-hydroxyphenyl)-propane, tetramethyl bisphenol A, 1,1-bis-(4-hydroxyphenyl)-isobutane, 1,1-bis-(4-hydroxyphenyl)-cyclohexane, 4,4'-dihydroxydiphenyl-sulphide, 4,4'-dihydroxydiphenyl, 4,4'-dihydroxydiphenylsulphone and the di- and tetra-halogenated derivatives thereof. Bisphenol A is particularly preferred. Any mixtures of the diphenols mentioned above may also be used.

The following are preferably used as chain-terminators for the aromatic polyester whose mould-removability may be improved according to the invention: phenol, alkyl phenols having C$_1$–C$_{12}$ alkyl groups, halogenated phenols, hydroxydiphenyl, naphthols, chlorocarbonic acid esters obtained from such phenolic compounds and chlorides of aromatic mono-carboxylic acids which may optionally be substituted by C$_1$–C$_{22}$ alkyl groups and halogen atoms, in quantities of from 0.1 to 10 mol % (in the case of phenols based on diphenols, and in the case of acid chlorides, based on acid dichlorides).

The following may preferably be used as branching agents for the aromatic polyesters whose mould-removability may be improved according to the invention: tri-or polyfunctional carboxylic acid chlorides or tri- and polyfunctional phenols in quantities of from 0.01 to 1 mol %, based on the dicarboxylic acid chlorides used or on the diphenols used.

The aromatic polyesters may also contain as much as 10 mol % of acid anhydride-groups (based on the total of carboxylic ester groups, carbonate groups and anhydride groups).

Processes for the production of aromatic polyesters are known: they may be produced from diphenols, iso- and/or terephthalic acids, chain terminators and optionally branching agents according to the transesterification process or from diphenols, iso- and/or terephthalic aciddichlorides, chain terminators and optionally branching agents in the melt, in solution or according to the phase interface process; see V. V. Korshak and S. V. Vinogradova, "Polyesters", Pergamon Press, 1965.

The partial replacement of ester groups by carbonate groups is also known (G. S. Kolesnikow et. al., J. Polym. Sci. USSR, Vol. 9, 1967, P. 1705 to 1771; U.S. Pat. Nos. 2,030,331; 3,169,121; 3,409,704; German Offenlegungsschrift Nos. 2,714,544 and 2,758,030).

The mould-release agents which are normally present in powder form and are to be used according to the invention are worked into the aromatic polyesters, for example, by spinning onto the polyester granulate, by subsequent homogenisation in an extruder and by regranulating.

The mould-release agents may also be added to the polyesters during the production process, for example, before the solutions thereof are evaporated.

Finally, it is also possible to spin the pulverulent mould-release agents on the granulated material and to directly process this material into mouldings.

The aromatic polyesters provided with mould-release agents may contain stabilizers, flow agents, plasticisers and fillers, e.g. glass fibres, glass balls, asbestos and carbon fibres, kieselguhr, kaolin, rock powder and pigments.

The aromatic polyesters improved according to the invention may be processed into moulded bodies according to conventional processes in injection moulding machines or may be processed into a semifinished product in extruders. The moulding compositions are widely used where moulded bodies are produced in a completely automatic manner according to the injection moulding process in large numbers with short cycle times. This applies, for example, for use in the electrotechnical and opticalsectors, e.g. for multipoint connectors, coils, complicated housings such as projector housings, lower plates of switch boxes etc., and for particularly complicated moulded bodies which are released from the moulding tools in which there are regions of greatly differing temperatures. No mould-release difficulties occur during the production of such parts even at an elevated temperature.

The efficiency of the hydrogenated polybenzyls to be used according to the invention may be measured using the mould-release forces required in the release from the mould of injection moulded parts. These are determined in the following Examples by visualising the pressure arising during release from the mould in the oil cylinder of the ejector system by means of an optical, simultaneously recording indication device.

EXAMPLES

The following aromatic polyesters are used in the following Examples:

Polyester A (iso-/terephthalic acid 1:1 and bisphenol-A) from 9.12 kg of bisphenol-A, 4.14 kg of iso- and 4.14 kg of terephthalic acid dichloride and 0.15 kg of phenol relative viscosity $\eta_{rel}=1.258$ (Ubbelohde Viscosimeter, solution of 0.5 g of substance in 100 ml of dichloromethane solution, measured at 25° C.)

notched impact strength $a_k=20.2$ kJ/m² (DIN 53 453)

Dimensional stability under heat Vicat B=190° C. (DIN 53 460, process B)

Melting index (MFI)=36 g/10 min. (DIN 53 735)

Chlorobenzene residual content=approximately 50 ppm

Polyester B (bisphenol-A and iso-/terephthalic acid 3:2) from 9.12 kg of bisphenol-A, 4.968 kg of iso- and 3.312 kg of terephthalic acid dichloride and 0.152 kg of phenol $\eta$ rel=1.261
$a_k=19.7$ kJ/m²
Vicat B=190° C.
MFI=34 g/10 min.
Chlorobenzene residual content approx. 50 ppm.

Polyester C (bisphenol-A and iso-/terephthalic acid-dichloride 1:1; 30 mol % of the ester groups are replaced by carbonate groups in statistical distribution) from 2.736 kg of bisphenol-A, 0.852 kg each of iso- and terephthalic acid dichloride, 39.5 g of phenol and 0.6 kg of phosgene.

$\eta$ rel=1.262
$a_k=18.3$ kJ/m²
Vicat B=176° C.
MFI=38 g/10 min.

Polyester D (bisphenol-A and iso-/terephthalic acid-dichloride 1:1, 10 mol % of the ester groups are replaced by carbonate groups in the form of blocks) from 2.736 kg of bisphenol-A, 1.096 kg each of iso- and terephthalic acid dichloride, 67.86 g of p-tert.-butylphenol and 0.215 kg of phosgene.

$\eta$ rel=1.253
$a_k=16.9$ kJ/m²
Vicat B=182° C.
MFI=41 g g/10 min.

Hydrogenated Polybenzyl E 3 kg of benzyl chloride are added dropwise into a stirred mixture of 3 liters of dried dichloromethane and 60 ml of TiCl₄ at from 20° to 25° C. during 10 hours. The reaction mixture became a dark brown colour with vigorous HCl evolution. 10 hours after completion of the dropwise addition, nitrogen was passed through the reaction mixture for approximately 10 hours in order to remove the HCl gas. Upon subsequent shaking with water, the solution became yellow in colour.

The solution was freed from residual HCl using dilute aqueous NaOH and was washed with water until free of salt. Upon evaporating the solvent, the polybenzyl remained as a brittle yellow resin having a melting range of from 89° to 94° C.

The resin contained approximately 0.037 % by weight of chlorine, had an average molecular weight $\overline{M}_n$ of 2555 and a nonuniformity of 2.77 (gel-chromatographic determination using THF as the solvent).

The polybenzyl obtained was hydrogenated in an autoclave at 240° C. and from 250 to 300 bars using Raney nickel as the catalyst. After using up the quantity of hydrogen calculated for complete saturation, a colourless substance was obtained having a melting range of from 103° to 108° C.

Hydrogenated polybenzyl F

The process was carried out analogously to the above polybenzyl production, but instead of using TiCl₄, 45 g of dry aluminium chloride were used. The polybenzyl obtained was a brittle yellow resin having a melting range of from 99° to 104.5° C., a chlorine content of 0.073 % by weight, an average molecular weight $\overline{M}_n$ of 5950 and a nonuniformity of 1.22.

Hydrogenation took place analogously to the production of the hydrogenated polybenzyl E. The reaction was stopped after using up approximately 80% of the quantity of hydrogen required for complete saturation. The product which was obtained was colorless and had a melting range of from 102° to 106° C.

The hydrogenated polybenzyls were worked into the aromatic polyesters in a double shaft extruder having a screw diameter of 32 mm at approximately 310° C. The types of polyester used in each case, the quantities of mould-release agents and the characteristics of the mixtures are given in the following Table.

The relative solution viscosity ($\eta$ rel) was determined using an Ubbelohde viscosimeter and a solution of 0.5 g of polyester in 100 ml of dichloromethane solution at 23° C.

The mould-release behaviour of the moulding compositions was examined on a conical cylinder which was 35 mm long, with an external diameter of 40 or 42 mm and a wall thickness of 2 mm, by measuring the pressure arising in the ejector system. The mould-release pressures may also be seen in the Table.

| Example | Type of Polyester | (%) mould-release agent/type | Notched impact strength $a_k$ according to DIN 53453 (kJ/m²) | Dimensional stability under heat according to Vicat, Method B (DIN 53460) (°C.) | $\eta$ rel | Mould-release pressure at 150° C.(bar) |
|---|---|---|---|---|---|---|
| 1 | A | 0.1/E | 19.1 | 188 | 1.256 | 11 |
| 2 | B | 0.1/E | 18.6 | 187 | 1.258 | 10 |
| 3 | C | 0.1/F | 17.2 | 173 | 1.258 | 9 |
| 4 | D | 0.1/F | 15.8 | 179 | 1.250 | 11 |

-continued

| Example | Type of Polyester | (%) mould-release agent/type | Notched impact strength $a_k$ according to DIN 53453 (kJ/m²) | Dimensional stability under heat according to Vicat, Method B (DIN 53460) (°C.) | $\eta$ rel | Mould-release pressure at 150° C.(bar) |
|---|---|---|---|---|---|---|
| 5 | A | 0.2/E | 18.3 | 186 | 1.253 | 7 |
| 6 | B | 0.2/E | 18.1 | 186 | 1.254 | 6 |
| 7 | C | 0.2/F | 16.6 | 171 | 1.254 | 5.5 |
| 8 | D | 0.2/F | 15.3 | 177 | 1.248 | 7 |
| 9 | A | 0.2/pentaery-thritol tetra-stearate | 16.2 | 185 | 1.251 | 15 |
| comparison 10 | C | 0.2/1,4-cyclo-hexanediol di-stearate | 11.2 | 165 | 1.253 | 18 |
| A | — | | | | | 40 |
| B | — | | | | | 38 |
| C | — | | | | | 41 |
| D | — | | | | | 40 |

We claim:

1. In the process of moulding an aromatic polyester in the presence of a mould-release agent, the improvement wherein said mould-release agent is hydrogenated polybenzyl of the formula

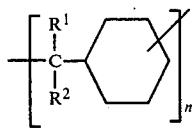

wherein n is 3 to 300 and $R^1$ and $R^2$ are each hydrogen or alkyl having from 1 to 5 carbon atoms.

2. The process of claim 1 wherein the hydrogenated polybenzyl is used in an amount of from 0.01 to 3% by weight, based on the aromatic polyester.

3. The process of claim 1 wherein the hydrogenated polybenzyl is used in an amount of from 0.05 to 1% by weight, based on the aromatic polyester.

4. The process of claim 1 wherein the hydrogenated polybenzyl has a number average molecular weight of from 300 to 300,000.

5. The process of claim 1 wherein the hydrogenated polybenzyl has a number average molecular weight of from 1,000 to 10,000.

6. The process of claim 1 wherein the hydrogenated polybenzyl contains up to 30% of aromatic rings, based on the number of carbocyclic radicals.

7. The process of claim 1 wherein the aromatic polyesters are reaction products obtained from aromatic dihydroxy compounds and isoterephthalic acid, terephthalic acid or mixtures thereof and chain terminators.

8. The process of claim 1 wherein up to 50 mol % of the ester groups of aromatic polyester are replaced by carbonate groups.

9. The process of claim 1 wherein the aromatic polyester contains up to 10 mol % of acid anhydride groups, based on the total of carboxylic acid groups, carbonate groups and anhydride groups.

10. The process of claim 1 wherein said hydrogenated polybenzyl is of the formula

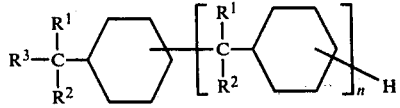

wherein $R^1$ and $R^2$ are hydrogen or alkyl having from 1 to 5 carbon atoms, $R^3$ is hydrogen iodine, chlorine or bromine and n is a number from 3 to 300.

* * * * *